United States Patent [19]

Suzuki et al.

[11] Patent Number: 4,986,324
[45] Date of Patent: Jan. 22, 1991

[54] PNEUMATIC TIRE TREAD WITH SYMMETRICAL GROOVES HAVING A BENT SHOULDER PORTION

[75] Inventors: Toshihiko Suzuki; Kenichi Shirai, both of Hiratsuka, Japan

[73] Assignee: The Yokohama Rubber Co., Ltd., Tokyo, Japan

[21] Appl. No.: 331,331

[22] Filed: Mar. 31, 1989

[30] Foreign Application Priority Data

Apr. 28, 1988 [JP]  Japan ................................. 63-104030

[51] Int. Cl.⁵ ............................................. B60C 11/03
[52] U.S. Cl. ................................................. 152/209 R
[58] Field of Search ........... 152/209 R, 209 D, 209 B; D12/140-151

[56] References Cited

U.S. PATENT DOCUMENTS 4,796,683 1/1989 Kawabata et al. .............. 152/209 R
4,807,679 2/1989 Collette et al. .................. 152/209 R

FOREIGN PATENT DOCUMENTS 299766 1/1989 European Pat. Off. ........ 152/209 D

Primary Examiner—Michael W. Ball
Assistant Examiner—Geoffrey L. Knable
Attorney, Agent, or Firm—Armstrong, Nikaido, Marmelstein, Kubovcik & Murray

[57] ABSTRACT

A pneumatic tire having a tread pattern formed on a tread surface and comprising a plurality of main grooves extending in the center region of the tread surface towards the circumferential direction of the tire and a plurality of subgrooves extending so as to cross the plurality of main grooves, wherein the percentage groove area of the whole grooves including said main grooves and said subgrooves relative to the area of the whole tread surface is 20 to 30% and the number of pitches at which the circumferential direction of the tire is divided by the plurality of subgrooves is 30 to 45. The pneumatic tire is characterized in that the subgrooves each have a groove portion bent in a wedge form in shoulder regions respectively located outside the outermost main grooves.

5 Claims, 4 Drawing Sheets

PNEUMATIC TIRE TREAD WITH SYMMETRICAL GROOVES HAVING A BENT SHOULDER PORTION

BACKGROUND OF THE INVENTION

The present invention relates to a pneumatic tire and more particularly to a pneumatic tire improved in dry performance, particularly dry threshold performance, while maintaining the wet performance.

The term "dry performance" of a pneumatic tire is intended to mean the traction and driveability during travelling on a dry road surface. In particular, the term "dry threshold performance" is intended to mean the threshold cornering force caused during cornering which serves as a measure of the driveability of the tire. On the other hand, the term "wet performance" of a pneumatic tire is intended to mean the traction and driveability during travelling on a wet road surface. The wet performance is greatly influenced by the ability of main grooves and subgrooves provided on the tread surface of reject water.

It is believed that a lowering in the groove area occupied by the main grooves and subgrooves on the tread surface is useful for improving the dry performance of a pneumatic tire. However, the lowering in the percentage groove area brings about a problem with a lowering in the wet performance due to a lowering in the ability to reject water. For this reason, in the conventional pneumatic tire for passenger cars, the percentage groove area of the tread surface was limited to 30 to 40% for the purpose of offering a balance between the dry performance and the wet performance.

However, the dry performance of the conventional tire cannot cope with an improvement in the performance of the engine of a passenger car in recent years, which renders the dry threshold performance during cornering unsatisfactory.

SUMMARY OF THE INVENTION

An object of the present invention is to provide a pneumatic tire, particularly a pneumatic tire for a passenger car, improved in the dry performance while maintaining the wet performance.

Another object of the present invention is to provide a pneumatic tire for a passenger car remarkably improved particularly in the dry threshold performance while maintaining the wet performance.

The above-described objects of the present invention can be attained by a pneumatic tire having a tread pattern formed on a tread surface and comprising a plurality of main grooves extending in the center region of said tread surface towards the circumferential direction of the tire and a plurality of subgrooves extending so as to cross said plurality of main grooves, wherein the percentage groove area of all of the grooves including the main grooves and the subgrooves relative to the total area of the tread surface is 20 to 30% and the number of pitches at which the circumferential direction of the tire is divided by the plurality of subgrooves is 30 to 45. The limitations of the percentage groove area and the number of pitches to small values brings about an increase in the rigidity of the blocks defined by the above-described main grooves and subgrooves and improves the dry performance.

Further, according to the present invention, in a tread pattern having the above-described percentage groove area and number of pitches, the above-described subgrooves are each bent in a wedge form in both shoulder regions respectively located outside the outermost main grooves to form a bent groove portion. The wedge-shaped bent groove portion formed in each shoulder region enables excellent ability to reject water to be maintained despite a reduction in the percentage groove area and the number of pitches, which makes it possible to ensure excellent wet performance. Further, the above-described wedge-shaped bent groove portion increase the rigidity of the block in the shoulder region and enables a further remarkable improvement in the dry threshold performance.

DETAILED DESCRIPTION OF THE PREFERRED EMBODIMENTS

Figure 1:
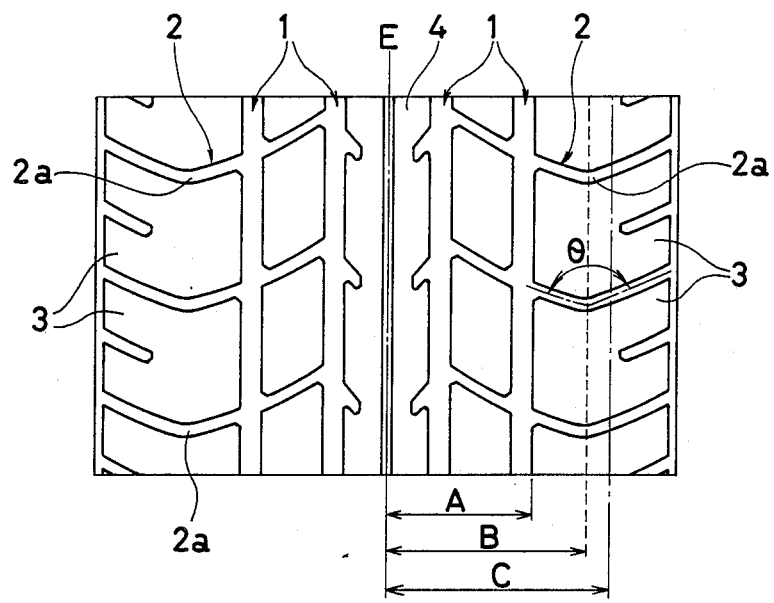
FIG. 1 is a plan view of a tread surface of an example of the pneumatic tire according to the present invention.

The tread surface of a pneumatic tire shown in FIG. 1 has four main grooves 1 substantially straightforward in the circumferential direction of the tire. Further, a number of subgrooves 2 are symmetrically provided about the equator E of the tread surface. These subgrooves 2 extend from the center region of the tread surface respectively towards the right and left shoulder regions and straightly cross the above-described main grooves 1. These subgrooves 2 are provided at a predetermined pitch in the circumferential direction of the tire. Although the pitch may be constant, it is preferred that the subgrooves are provided in a combination of different several kinds of pitches. A number of blocks 3 are formed on the tread surface through crossing between the plurality of main grooves 1 and the subgrooves 2. A rib 4 is formed between two main grooves 1 located inside the tread surface.

In the above-described tread pattern, the percentage groove area S of the whole grooves including the above-described main grooves 1 and subgrooves 2 relative to the area of the whole tread surface is limited to a relatively small range, i.e., 20 to 30%. Further, the number of pitches, P, at which the circumferential direction of the tire is divided by a number of subgrooves 2 is also limited to a relatively small range, i.e., 30 to 45. The limitations of the percentage groove area S and the number of pitches, P, respectively to the above-described relatively small ranges brings about an increase in the rigidity through an increase in the size of each block, which contributes to an improvement in the dry performance of the tire. In particular, the increase in the rigidity brings about an increase in the cornering force during cornering, which contributes to a remarkable improvement in the dry threshold performance.

In the above-described tread pattern, the subgrooves 2 are bent each in a wedge form at portions extending to blocks 3 of the shoulder portions located on the outermost side to form a bent groove portion 2a within the blocks 3. The wedge-shaped bent groove portions 2a serve to maintain excellent ability to reject water despite the above-described reduction in the percentage groove area S and the number of pitches, P. The above-described bent groove portions 2a contribute to an improvement in the ability to reject water during cornering and prevents the wet performance during cornering from lowering. In addition, since the bent groove portions 2a further increase the block rigidity of the outermost shoulder portions, the dry threshold performance can be further improved.

In order to further enhance the above-described effect exerted by the bent groove portions 2a, it is preferred to limit the opening or included angle $\theta$ of the bent groove portion on the side having a smaller angle to 130 to 160°. When the opening angle $\theta$ is larger than 160°, the effect of maintaining excellent ability to reject water is lowered, while when the opening angle is smaller than 130°, the effect of improving the rigidity of the blocks 3 is lowered. When the subgrooves are each slightly curved as shown in FIG. 1, the opening angle $\theta$ is defined by an angle made by both lines formed by connecting the center of the groove of the bent groove portion 2a to the center of the subgroove at both end portions of the block 3 extending from the bent groove portion 2a to both sides thereof. When a notch is provided at the end portion of the block as shown in FIG. 1, the center of the width of the subgroove on an assumption that there is no notch is regarded as the center of the subgroove.

In order to further enhance the above-described effect exerted by the bent grooves 2a, it is preferred to limit the distance B from the equator E to the bent groove portion 2a shown in FIG. 1 to 80 to 90% of a half-length, C, of the ground contacting width of the tread. More preferably, besides the position of the above-described bent groove portion 2a, the distance A from the equator E to the main groove 1 located on the outermost side is preferably limited to 75% or less of a half-length C of the ground contacting width of the tread.

Figure 2:
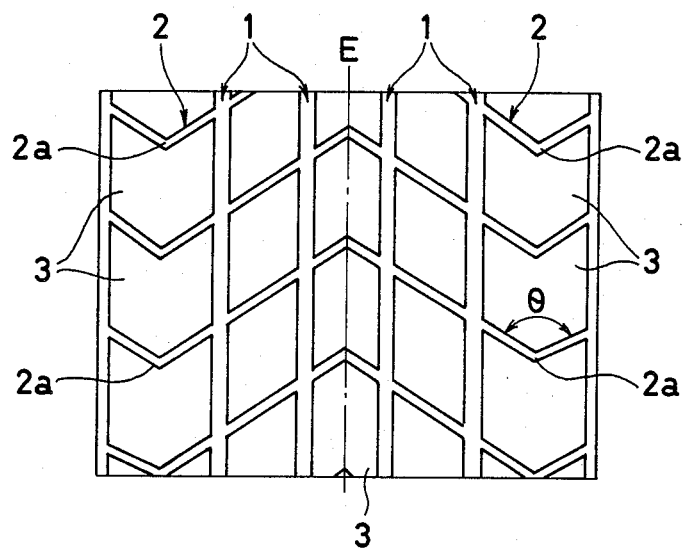
FIG. 2 is a plan view of a tread surface of another example of the pneumatic tire according to the present invention.

In the above-described tread pattern, as shown in FIG. 1, the subgrooves 2 may be discontinuous at a portion between two innermost grooves 1, i.e., at a portion between two main grooves 1 sandwiching the equator E. Alternatively, as shown in FIG. 2, the subgrooves 2 may be connected to each other. However, in order to improve the ability to reject water, the subgrooves 2 should be continuous from the center region of the tread to the end portions of the shoulder portions. It is preferred that the subgrooves 2 be substantially straight. It is noted in this connection that the subgrooves may be in a slightly curved straight form as shown in FIG. 1 or a completely straight form as shown in FIG. 2.

There is no particular limitation with respect to the groove width and the groove depth of the main grooves 1 and the subgrooves 2. However, it is preferred that the main grooves 1 each have a groove width of 6 to 12 mm and a groove depth of 5 to 8 mm while the subgrooves 2 each have a groove width of 3 to 6 mm and a groove depth of 5 to 8 mm.

As described above, in the tire of the present invention, since the percentage groove area of the whole grooves including the main grooves and the subgrooves and the number of pitches are respectively limited to small values, the block rigidity is increased, which contributes to an improvement in the dry performance. Despite the limitations of the percentage groove area and the number of pitches to small values, excellent wet performance can be ensured through maintenance of excellent ability to reject water because the subgrooves have wedge-shaped bent groove portions formed in blocks in the shoulder regions. Further, the above-described wedge-shaped bent groove portions increase the block rigidity of the shoulder regions, which contributes to a further improvement in the dry threshold performance.

EXAMPLE 1

Three types of radial tires, i.e., a tire of the present invention, a conventional tire and a comparative tire, respectively having the following structures were prepared.

Tire of the present invention:
  tire size: 205/55R16
  tread pattern: FIG. 2
  percentage groove area: 26%
  number of pitches: 33
  position of main groove provided on the outermost side (A/C): 70%
  position of bent groove portion (B/C): 90%
  opening angle of bent groove portion: 145°

Figure 3:
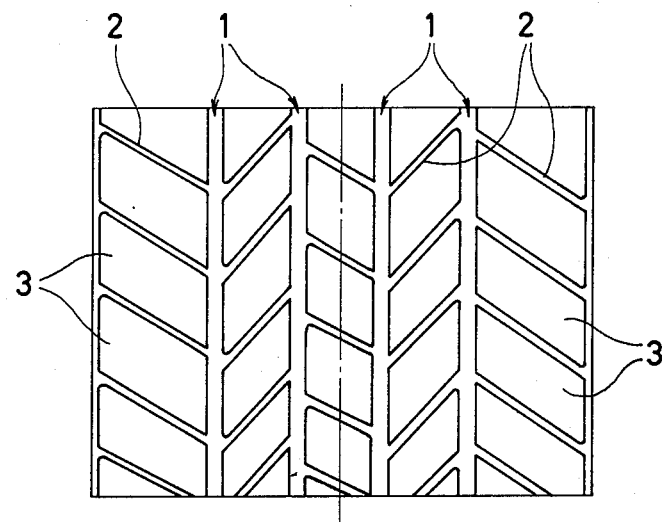
FIG. 3 is a plan view of a tread surface of a conventional pneumatic tire.

Conventional tire:
  tire size: the same as that of the tire of the present invention
  tread pattern: FIG. 3
  percentage groove area: 34%
  number of pitches: 60
  position of main groove provided on the outermost side (A/C): 80%

Figure 4:
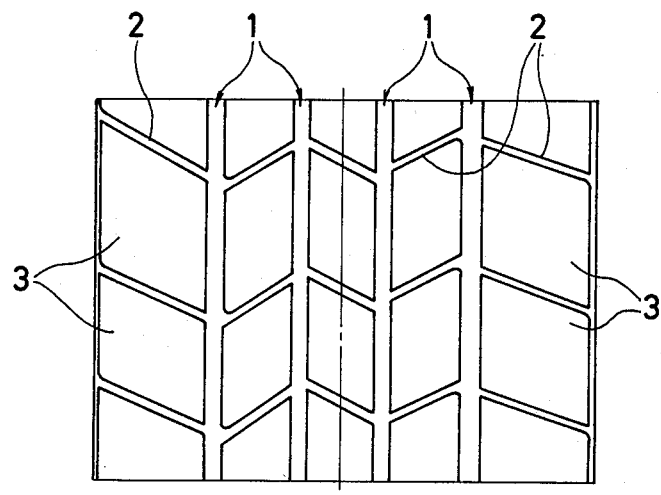
FIG. 4 is a plan view of a tread surface of a pneumatic tire of a comparative example.

Comparative tire:
  tire size: the same as that of the tire of the present invention
  tread pattern: FIG. 4
  percentage groove area: the same as that of the tire of the present invention
  number of pitches: 34
  position of main groove provided on the outermost side (A/C): the same as that of the conventional tire As shown in FIGS. 3 and 4, in the above-described conventional tire and comparative tire, the directions of the inclination of the subgrooves 2 are alternately varied at intersections of the main grooves 1 and the subgrooves 2, as opposed to the tire of the present invention shown in FIG. 2 which has a bent groove portion 2a within a block 3 in the outermost shoulder region. The comparative tire has substantially the same tread pattern as that of the conventional tire. However, the percentage groove area is the same as that of the tire of the present invention, and the number of pitches is substantially the same as that of the tire of the present invention.

Figure 5:
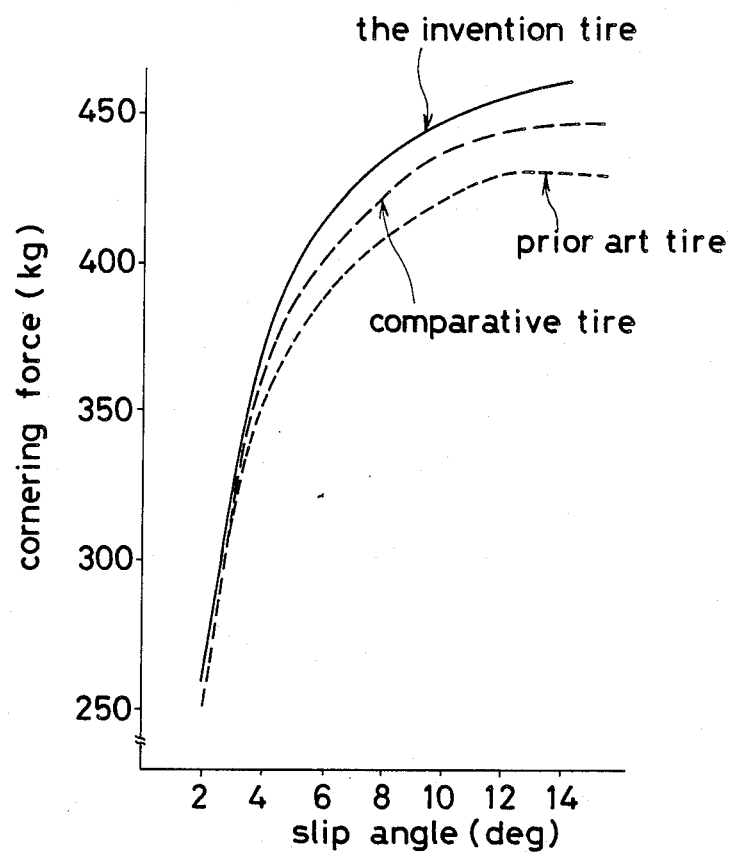
FIG. 5 is a graph showing the relationship between the slip angle and the cornering force.

The three above-described types of radial tires were subjected to a change in the slip angle in the drum test, and the cornering force was measured for each slip angle. The results are shown in FIG. 5. It was found that the tire of the present invention exhibited a far higher cornering force than those of the conventional tire and the comparative tire, i.e., is excellent in the driveability as dry performance.

Further, with respect to each tire, the dry threshold performance and the wet performance during cornering were measured respectively by the following methods. The results are shown in the following Table.

(Dry Threshold Performance)

Each tire was mounted on an actual vehicle. The vehicle was travelled in a circuit by five test drivers, and the cornering threshold performance was graded by feeling of the test drivers on the basis of 10 points. The average value of the points determined by the five test drivers were regarded as the dry threshold performance. In the Table, the dry threshold performance was expressed in terms of an index calculated by assuming the dry threshold performance of the conventional tire to be 100.

(Wet Performance)

Each tire was mounted on an actual vehicle and whirlingly travelled around a circle having a radius of 30 m drawn on a wet road having a water depth of about 4 mm to measure the threshold lateral acceleration. The value of the threshold lateral acceleration was regarded as the wet performance during cornering. In the Table, the wet performance was expressed in terms of an index calculated by assuming the wet performance of the conventional tire to be 100.

|  | Tire of the present invention | Conventional tire | Comparative tire |
| --- | --- | --- | --- |
| dry threshold performance | 120 | 100 | 108 |
| wet performance | 101 | 100 | 92 |

As is apparent from the results shown in the above Table, although the tire of the present invention exhibited an improvement in the dry threshold performance over that of the conventional tire, there occurred no lowering in the wet performance.

EXAMPLE 2

Figure 6:
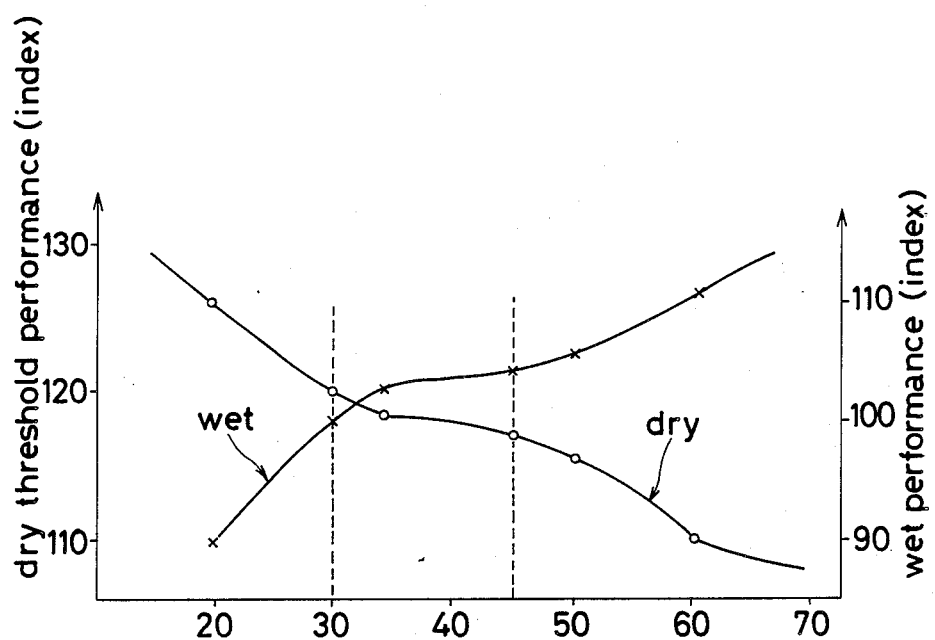
FIG. 6 is a graph showing the relationship between the number of pitches provided in the circumferential direction of the tire and each of the dry threshold performance and the wet performance.

Five types of radial tires were prepared which have the same structure as that of the tire of the present invention in Example 1, except that only the number of pitches was varied to 20, 30, 45, 50, and 60. The respective radial tires were subjected to the tests of the dry threshold performance and the wet performance during cornering by the same measuring methods as those employed in Example 1. The results of the measurement were expressed in terms of an index calculated by assuming the measurements of the conventional tire of Example 1 to be 100, and the results are shown in FIG. 6. As is apparent from the results shown in FIG. 6, the tire of the present invention wherein the number of pitches was limited to 30 to 45 had improved dry threshold performance while maintaining the wet performance comparable to that of the conventional tire.

What is claimed is:

1. A pneumatic tire having a tread pattern formed on a tread surface between two shoulder regions of the tire comprising a plurality of main grooves extending straightforward in the center region of said tread surface in the circumferential direction of the tire and a plurality of subgrooves extending so as to straightly cross said plurality of main grooves and lead to end portions of said shoulder regions, said main grooves and said subgrooves are symmetrically provided about the equator of said tire, a percentage groove area of all of the grooves including said main grooves and said subgrooves relative to the total area of the tread surface is 20 to 30%, the number of pitches at which the circumferential direction of the tire is divided by said plurality of subgrooves is 30 to 45, said subgrooves each have a bent groove portion bent in a wedge form in each shoulder region located outside an outermost main groove, and an included angle $\theta$ of said bent groove portion is 130° to 160°.

2. A pneumatic tire according to claim 1, wherein the distance from the equator of the tire tread surface to said bent groove portion is 80 to 90% of ½ of the ground contacting width of the tread pattern.

3. A pneumatic tire according to claim 2, wherein the distance from the equator of the tread surface to said outermost main groove is 75% or less of ½ of the ground contacting width of the tread.

4. A pneumatic tire according to claim 1, wherein said main grooves each have a width of 6 to 12 mm and a depth of 5 to 8 mm and said subgrooves each have a width of 3 to 6 mm and a depth of 5 to 8 mm.

5. A passenger car pneumatic tire having a tread pattern formed on a tread surface between two shoulder regions of the tire comprising a plurality of main grooves extending straightforward in the center region of said tread surface in the circumferential direction of the tire and a plurality of subgrooves extending so as to straightly cross said plurality of main grooves and lead to end portions of said shoulder regions, said main grooves and said subgrooves are symmetrically provided about the equator of said tire, a percentage groove area of all of the grooves including said main grooves and said subgrooves relative to the total area of the tread surface is 20 to 30%, the number of pitches at which the circumferential direction of the tire is divided by said plurality of subgrooves is 30 to 45, said subgrooves each have a bent groove portion bent in a wedge form in each shoulder region located outside an outermost main groove, and an included angle $\theta$ of said bent groove portion is 130° to 160°.

* * * * *